United States Patent [19]

Ueda et al.

[11] Patent Number: 5,240,769
[45] Date of Patent: * Aug. 31, 1993

[54] PACKING MATERIAL AND PACKING MADE OF THE SAME

[75] Inventors: Takahisa Ueda; Tomikazu Shiomi, Kobe, both of Japan

[73] Assignee: Nippon Pillar Packing Co. Ltd., Osaka, Japan

[*] Notice: The portion of the term of this patent subsequent to Nov. 10, 2009 has been disclaimed.

[21] Appl. No.: 845,162

[22] Filed: Mar. 3, 1992

Related U.S. Application Data

[63] Continuation of Ser. No. 216,908, Jun. 15, 1988, Pat. No. 5,134,030.

[30] Foreign Application Priority Data

Nov. 25, 1986 [JP] Japan .............................. 61-280968

[51] Int. Cl.$^5$ ............................ D04C 1/00; D06P 7/00
[52] U.S. Cl. .................................... 428/365; 428/289; 428/367; 428/377; 428/408; 57/230; 57/231; 57/232; 277/230; 277/DIG. 6; 87/1; 87/6; 87/9
[58] Field of Search .............. 428/224, 289, 365, 367, 428/377, 397, 408; 57/230, 231, 232; 277/230, DIG. 6; 87/1, 6, 9

[56] References Cited

U.S. PATENT DOCUMENTS 4,559,862 12/1985 Case et al. .................................. 87/1
4,705,722 11/1987 Ueda et al. ........................... 428/365

FOREIGN PATENT DOCUMENTS 60-84476 5/1985 Japan .

Primary Examiner—George F. Lesmes
Assistant Examiner—Christopher Brown
Attorney, Agent, or Firm—Jones, Tullar & Cooper

[57] ABSTRACT

This invention relates to a packing used in sealing two members. As the packing material, by using a material having the surface of a flexible graphite sheet cut to a width of less than 5 mm with fibers, or a material prepared by laminating a flexible graphite sheet cut to a width of less than 5 mm with at least one of reinforcing fiber or foil material, and covering its surface with fibers, or a material prepared by impregnating a principal component composed of flexible graphite particles with at least one of short fiber, rubber, resin or lubricant to form a bar-like structure and covering its surface with fibers, a packing material which can be either twisted or braided is obtained. By fabricating a packing by using any one of such packing materials, a cord-like packing is obtained without having to produce many packings matched to with the dimensions of the members.

15 Claims, 6 Drawing Sheets

PACKING MATERIAL AND PACKING MADE OF THE SAME

This is a continuation of co-pending application Ser. No. 07/216,908 filed on Jun. 15, 1988, now U.S. Pat. No. 5,134,030.

FIELD OF THE INVENTION

1. Field of the Invention

This invention relates to packing material and packing preferably suitable to gland packing or the like for use in a shaft seal part of a hydraulic machine.

2. Prior Art

A variety of gland packings in which flexible graphite is used as a base material have been hitherto known for use in a shaft seal part or the like portion of a hydraulic machine, for example.

Gland packings of this sort are manufactured by various techniques, such as laminating, die molding, chip molding, and ribbon packing. However, these techniques require that the graphite material must be previously molded into a ring shape conforming to the diametral size of a shaft with which such packing is to be used; as such, the packing cannot be used with any shaft having a different diameter. Therefore, such packing lacks versatility in use. Another, difficulty with such packing is that since flexible graphite is of low tensile strength and brittle in itself, once the packing is mounted in position it is extremely difficult to remove same when replacement is required, which means less usability.

Further, aforesaid manufacturing techniques individually have drawbacks of their own. The laminating technique involves the problem of poor yield, which leads to higher cost. Where the die molding or chip molding technique is employed, dies or metal molds are required, which means higher cost, and the packing produced is less versatile. The ribbon packing technique does not provide good workability. These difficulties may be overcome by forming the flexible graphite into a cord-like structure so that it may be used by being cut to a specified length conforming to the diameter of the shaft, as is the case with such other type of packing as fiber braided or knitted; but the trouble is that flexible graphite cannot be braided or knitted because, as pointed out above, it is in itself of low tensile strength and so brittle that its compressibility and allowable limit of twist are both extremely low. Therefore, it has hitherto been considered impossible to use such packing in such a way as is usual with the aforesaid fiber braided or knitted type of packing, that is, in such a way that the braided or knitted packing is cut to a length according to the diametral size of the shaft with which it is to be used, the so cut packing being then wound about the outer periphery of the shaft.

Summary of the Invention

In order to overcome the aforesaid difficulties it is hence a primary object of this invention to present a packing material which can be either twisted or braided, and a twisted or braided cord-like packing by using the same packing material, by using a flexible graphite sheet cut to a width of less than 5 mm in order to advantageously utilize a characteristic feature of flexible graphite in sheet form in particular that if such sheet is cut to a width of less than 5 mm, both its compressibility and its allowable limit of twist are significantly increased as shown in FIG. 11 and FIG. 12, and by covering the flexible graphite sheet with a fiber material in order to attain the synergistic action of the fiber material and flexible graphite sheet.

It is a second object of this invention to present a packing material which can be either twisted or braided and is small in elongation and high in strength, and a twisted or braided cord-like packing by using the same packing material, by using a flexible graphite sheet cut to a width of less than 5 mm, laminating this flexible graphite sheet with at least one of reinforcing fiber material or foil material, and covering this surface with the fiber material to attain the synergistic action of the fiber material and flexible graphite sheet, and the reinforcing fiber or foil material.

It is a third object of this invention to present a packing material which can be either twisted or braided, and a twisted or braided cord-like packing by using the same packing material, by forming a bar mainly composed of flexible graphite particles and containing at least one of short fiber, rubber, resin or lubricant, and covering this surface with fiber in order to attain the synergistic action of the fiber material and the bar.

It is thus intended to improve usability and versatility.

In the packing material of this invention, since a flexible graphite sheet cut to a width of less than 5 mm is used, the compressibility and the allowable limit of twist are increased to make it possible to twist or braid, and moreover since the surface is covered with fibers, the toughness against bending and sliding may be also enhanced.

Furthermore, when a flexible graphite sheet cut to a width of less than 5 mm is laminated with at least one of reinforcing fiber or foil material, the strength is further increased and the elongation is decreased. By covering this surface with the fiber, moreover, the toughness against bending or sliding may be improved.

Meanwhile, by forming a bar by using flexible graphite particles as the base material and containing at least one of short fiber, rubber, resin or lubricant, twisting or braiding is enabled, and by adding at least one of short fiber, rubber and resin to the base material mainly composed of flexible graphite particles, the strength is increased and the elongation is restricted. When the surface is further covered with fiber, the toughness against bending or sliding may be improved.

Therefore, any of the these packing materials permits a cord-like structure to be cut to a specified length conforming to the shaft diameter, which was impossible hitherto, and to be used as a gland packing by bending this cut cord-like structure in a ring form, so that the usability and versatility may be greatly enhanced.

DETAILED DESCRIPTION OF THE PREFERRED EMBODIMENTS

Figure 1:
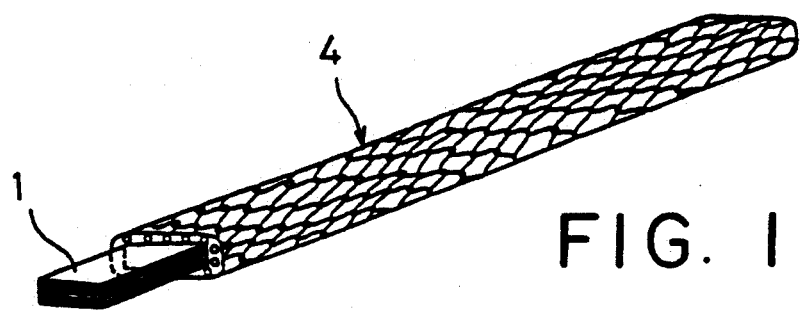
FIG. 1 is a partially cutaway view in perspective showing one embodiment of the packing material of the invention.

Referring now to the drawings, the present invention is described in details below.

In FIG. 1, of the flexible graphite sheets less than 1 mm in thickness and less than 5 mm in width, six pieces of the most preferable flexible graphite sheet 1 measuring 0.38 mm in thickness and 3 mm in width are prepared, and the surface of these six flexible graphite sheets 1 is covered with knitted Aramid fiber or nickel-chromium-iron alloy fiber to form a knitting thread 4, and this knitting thread 4 is used as the packing material.

Figure 2:
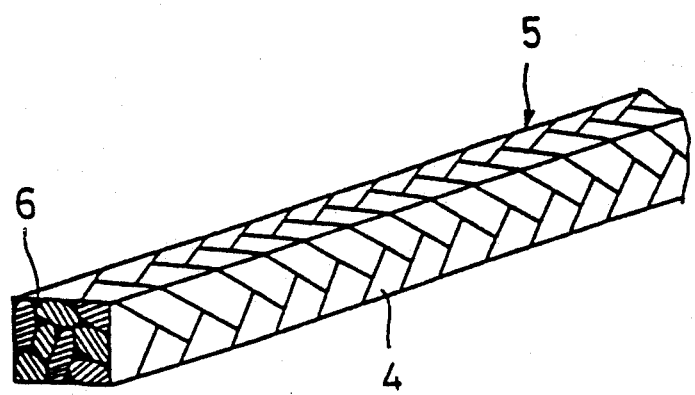
FIG. 2 is a partially cutaway view in perspective showing a cord-like packing formed by square braiding eight knitting threads by using the packing material in FIG. 1.

FIG. 2 shows a cord-like packing, in which eight knitting threads 4 shown above are used, and are square braided to form a cord-like structure 5, and the surface of the knitting threads 4, that is, the surface of the knitted covering fibers is impregnated with at least one of silicone oil, scale-form graphite and rubber-based adhesive or PTFE (polytetrafluoroethylene) instead of rubber-based adhesive], or with preferably these three sealers 6 together with zinc or sodium nitrite as a corrosion preventive.

Figure 3:
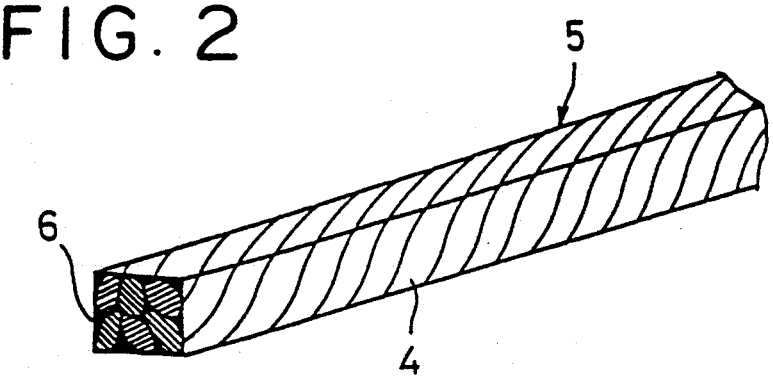
FIG. 3 is a partially cutaway view in perspective showing a twisted cord-like packing formed by bundling a plurality of the packing material in FIG. 1.

The packing in FIG. 3 is manufactured by bundling six knitting threads 4 and roll forming while twisting 20 turns/m to form a cord-like structure 5, and impregnating the surface of the knitting threads 4, that is, the surface of the knitted covering fibers with at least one of silicone oil, scale-form graphite and rubber-based adhesive (or PTFE instead of rubber-based adhesive), or preferably with these three sealers 6 together with zinc or sodium nitrite as a corrosion preventive.

Figure 11:
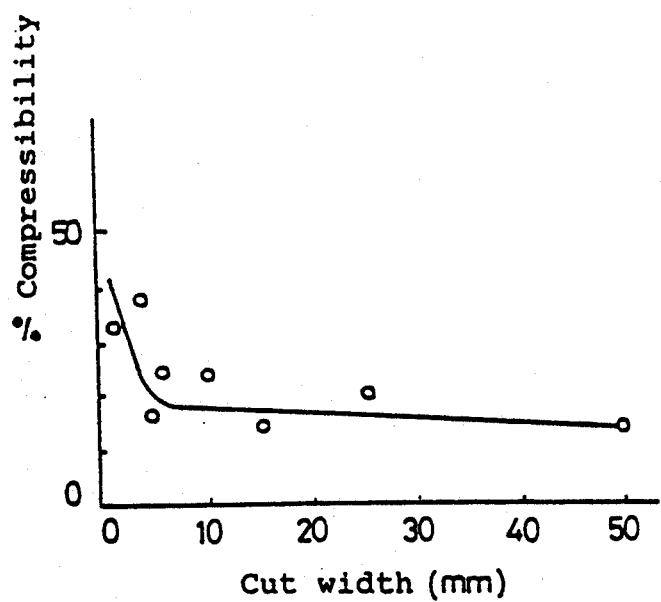
FIG. 11 is a graph showing the relationship between flexible graphite sheet cut width and its compressibility.
Figure 12:
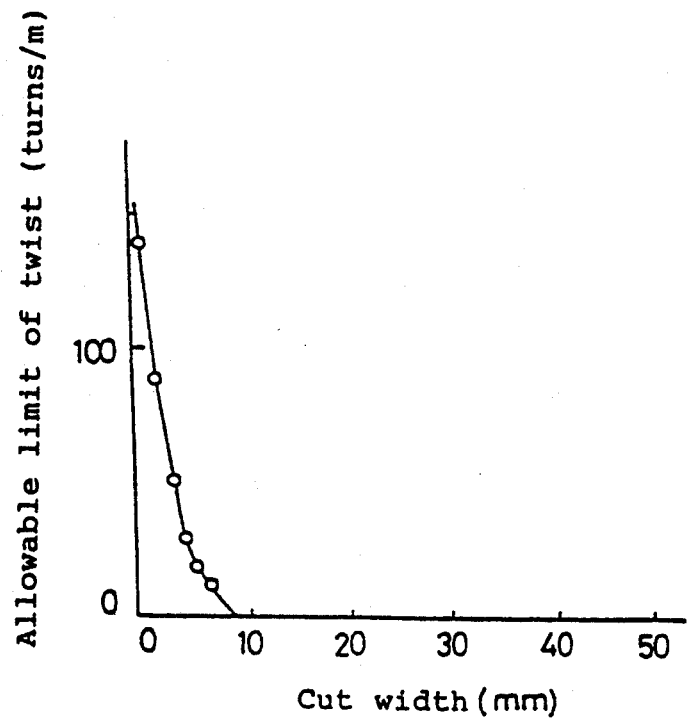
FIG. 12 is a graph showing the relationship between flexible graphite sheet cut width and its allowable limit of twist.

FIG. 11 presents experimental results on the relationship between cut width and compresssibility with respect to a flexible graphite sheet having a thickness of 0.38 mm, and FIG. 12 presents experimental results on the relationship between cut width and allowable limit of twist with respect to a 1-meter long flexible graphite sheet having a thickness of 0.38 mm.

It can be seen from these figures that the flexible graphite sheet has a characteristic feature that if its cut width is less than 5 mm, both its compressibility and its allowable limit of twist are remarkably increased.

This fact assures easy and accurate formation of a packing in a cord-like structure 5 as shown in FIG. 2 and FIG. 3, from the packing material (knitting thread 4) having the surface of six flexible graphite sheets 1 cut to a width of less than 3 mm with knitted Aramid fibers or nickel-chromium-iron alloy fibers. In other words, eight-thread square braiding and also twisting can be satisfactorily carried out without breakage being caused to the flexible graphite sheet 1 or the core material, that is, to the knitting thread 4. Therefore, the cord-like structure 5 may be readily cut to a specified length conforming to the diameter of the shaft, for example, for use as a gland packing. This means improved usability and versatility.

Figure 4:
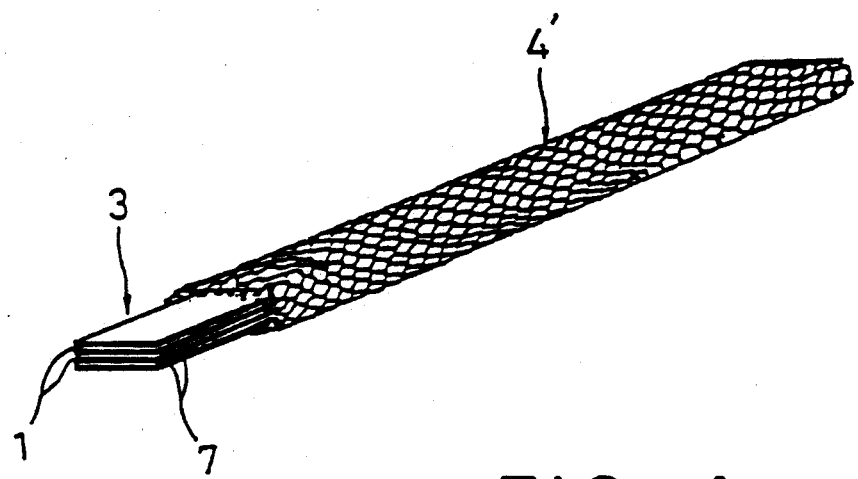
FIG. 4 is a partially cutaway view in perspective showing another embodiment of the packing material of the second invention.

In FIG. 4, of the flexible graphite sheets less than 1 mm in thickness and less than 5 mm in width, three pieces of the most preferable flexible graphite sheet 1 measuring 0.38 mm in thickness and 3 mm in width are prepared, and these three flexible graphite sheets 1, and four lead foils 7 of 0.1 mm in thickness and 3 mm in width are alternately laminated to form a core 3, and the surface of this core 3 is covered with knitted nickel-chromium-iron alloy fibers to form a knitting thread 4', which is used as the packing material.

Figure 5:
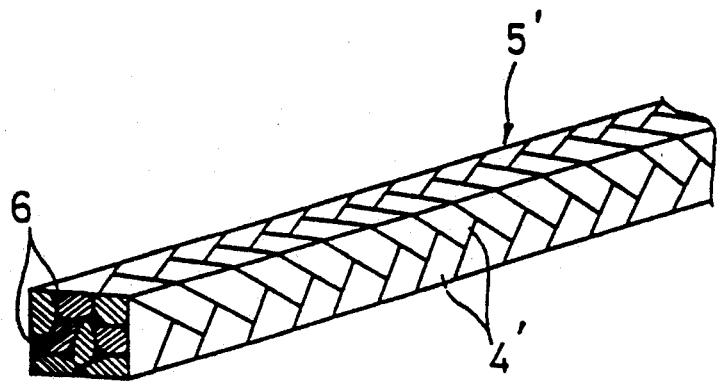
FIG. 5 is a partially cutaway view in perspective showing a cord-like packing formed by square braiding eight knitting threads by using the packing material in FIG. 4.

FIG. 5 shows a cord-like packing, in which eight o knitting threads 4' shown above are used, and are square braided to form a cord-like structure 5', and the surface of knitting threads 4', that is, the surface of the knitted covering fibers is impregnated with at least one of silicone oil, scale-form graphite and rubber-based adhesive (or PTFE instead of rubber-based adhesive), or with preferably these three sealers 6 together with zinc or sodium nitrite as a corrosion preventive.

Figure 6:
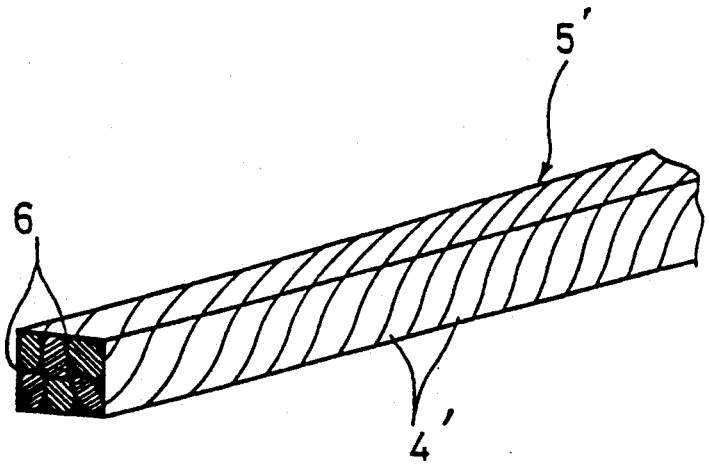
FIG. 6 is a partially cutaway view in perspective showing a twisted cord-like packing formed by bundling a plurality of the packing material in FIG. 4.

The packing in FIG. 6 is manufactured by bundling six knitting threads 4' and roll forming while twisting 20 turns/m to form a cord-like structure 5', and impregnating the surface of the knitting threads 4', that is, the surface of the knitted covering fibers with at least one of silicone oil, scale-form graphite and rubber-based adhesive (or PTFE instead of rubber-based adhesive), or preferably with these three sealers 6 together with zinc or sodium nitrite as a corrosion preventive.

Also from such packing material (knitting thread 4') manufactured by alternately laminating three flexible graphite sheets 1 cut to a width of 3 mm and four lead foils 7 to form a core 3, and covering the surface of this core 3 with knitted nickel-chromium-iron alloy fibers, a packing in cord-like structure 5' is obtained easily and securely as shown in FIG. 5 and. FIG. 6. In other words, eight-thread square braiding and also twisting can be satisfactorily carried out without breakage being caused to the flexible graphite sheet 1 or the core material, that is, to the knitting thread 4'. What is more, this knitting thread 4' is remarkably increased in strength owing to the intervening existence of lamination of lead foil 7, and since the surface is covered with knitting of nickel-chromium-iron alloy fibers, the bending performance o is improved. Accordingly, the cord-like structure 5' can be cut to a specified length conforming to, for example, the diameter of the shaft for use as a gland packing, which means improved usability and versatility.

Figure 7:
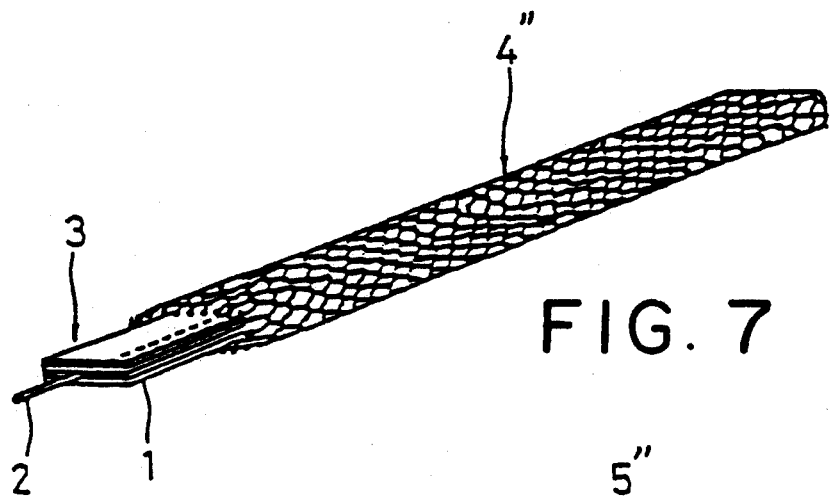
FIG. 7 is a partially cutaway view in perspective showing a modified example of the packing material of the second invention.

FIG. 7 shows a modified example of the packing material in FIG. 4. Four flexible graphite sheets 1 of 0.38 mm in thickness are cut to a width of 3 mm, and a reinforcing fiber 2 made of 0.15 mm nickel-chromiumiron alloy is laminated between the two layers in the top and bottom to form a core 3, and the surface of this core 3 is covered with knitted 0.1 mm nickel-chromium-iron alloy fibers to form a knitting thread 4", which is used as the packing material.

Figure 8:
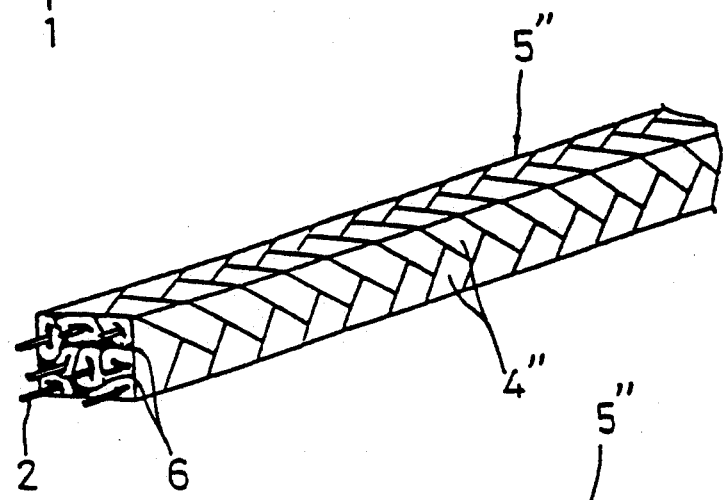
FIG. 8 is a partially cutaway view in perspective showing a cord-like packing formed by square braiding eight knitting threads by using the packing material in FIG. 7.

FIG. 8 shows a cord-like packing, in which eight knitting threads 4" shown above are square braided to form a cord-like structure 5", and the surface of the knitting threads 4", that is, the surface of knitted covering fibers is impregnated with at least one of silicone oil, scale-form graphite and rubber-based adhesive (or PTFE instead of rubber-based adhesive), or preferably with these three sealers 6 together with zinc or sodium nitrite as a corrosion preventive.

Figure 9:
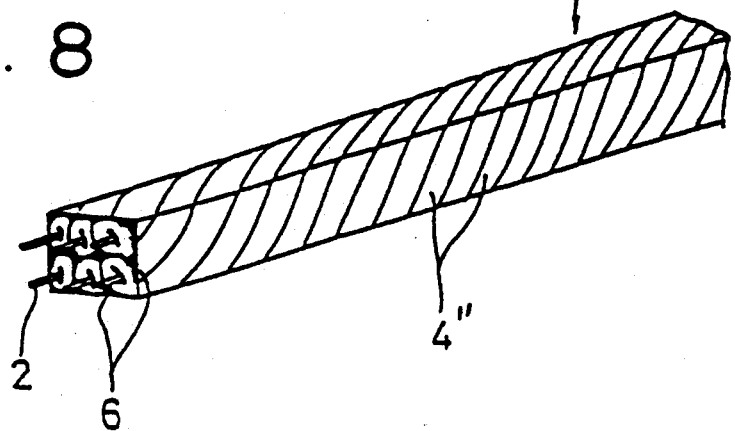
FIG. 9 is a partially cutaway view in perspective showing a twisted cord-like packing formed by bundling a plurality of the packing material in FIG. 7.

FIG. 9 shows a cord-like packing, in which six knitting threads 4" are bundled, and are roll formed while twisting 20 turns/m to form a cord-like structure 5", and the surface of the knitting threads 4", that is, the surface of the knitted covering fibers is impregnated with at least one of silicone oil, scale-form graphite and rubber-based adhesive (or PTFE instead of rubber-based adhesive), or preferably with these three sealers 6 together with zinc or sodium nitrite as a corrosion preventive.

In FIG. 8 and FIG. 9, too, the cord-like structure 5" can be easily and securely formed by the knitting thread 4", and an eight-thread square braiding and twisting can be satisfactorily carried out without breakage being caused to the flexible graphite sheet 1 or the core material, that is, to the knitting thread 4". Still more, the strength is remarkably increased by the reinforcing fiber 2 and knitted covering fiber (nickel-chromium-iron alloy), and the bending performance is also improved. Therefore, the cord-like structure 5" can be cut to a specified length conforming to the diameter of the shaft, for example, so as to be used as a gland packing, which means improved versatility and usability.

Figure 10:
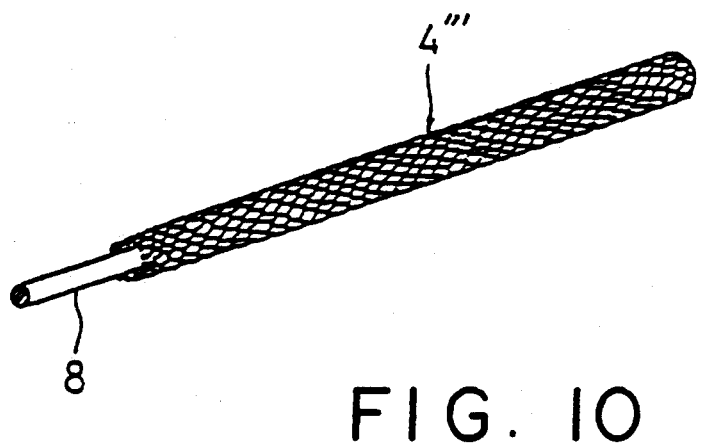
FIG. 10 is a partially cutaway view in perspective showing another embodiment of the packing material having a bar-shaped core material of the invention.

FIG. 10 represents an example of the preparation of packing material in which 60% flexible graphite particles, 25% natural graphite as lubricant, 10% rubber, and 5% Aramid short fibers are kneaded, and a circular solid bar-like structure 8 of 3 mm is formed by an extrusion forming machine, and the surface of this bar-like structure 8 is covered with 0.1 mm nickel-chromium-iron alloy fiber by knitting to form knitting thread 4''', which is used as the packing material.

From such packing material, that is, knitting thread 4''', a cord-like packing can be formed by square braiding eight knitting threads 4''' to form a cord-like structure, the same as in FIG. 5, and by impregnating the surface of the knitting threads 4''' with at least one of silicone oil, scale-form graphite and rubber-based adhesive (or PTFE instead of rubber-based adhesive), or preferably with these three sealers 6 together with zinc or sodium nitrite as a corrosion preventive.

It is also possible to form a cord-like packing by bundling six knitting threads 4''', and roll forming while twisting by 20 turns/m to form a cord-like structure, the same as in FIG. 6, and by impregnating the surface of the knitting threads 4''' with at least one of silicone oil, scale-form graphite and rubber-based adhesive (or PTFE instead of rubber-based adhesive), or preferably with these three sealers 6 together with zinc or sodium nitrite as a corrosion preventive.

In order words, even from the packing material (knitting thread 4''') as stated above, a cord-like packing can be formed easily and securely, and eight-thread square braiding or twisting of the knitting threads 4''' can be satisfactorily carried out without breakage being caused to the bar-like structure 8 mainly composed of flexible graphite particles or the core material, that is, to the knitting threads 4'''. Still more, since rubber and Aramid short fibers are kneaded, the strength is significantly increased, and the bending performance is improved, and this cord-like packing can be cut to a specified length conforming to the diameter of the shaft for use, for example, as a gland packing, which means improved versatility and usability.

As the reinforcing fiber 2 and covering fiber in the above embodiments, 0.1 mm nickel-chromium-iron alloy is used, but it is not limitative, and other materials may be used depending on the purpose of such, for example, metal fibers such as nickel-copper alloy and stainless steel, inorganic fibers such as asbestos, ceramic fiber, glass fiber and carbon fiber, and organic fibers such as cotton, rayon, phenol, Aramid, PBI (polybenzimidazole), PTFE (polytetrafluoroethylene), PEI (polyetherimide), PPS (polyphenylene sulfite), and PEEK (polyether etherketone).

As the foil material, 0.1 mm thick lead foil is used in the example, but metal foils such as copper and aluminum, pulse sheet, Aramid sheet, PBI sheet, PTFE sheet, PEI sheet, PSS sheet, PEEK sheet and others may be used depending on intended use.

As the short fiber to be kneaded with flexible graphite particles, in the above embodiment, Aramid short fiber was used, but it is not limitative, and other materials may be used depending on intended use, for example, metal short fibers such as nickel-chromium-iron alloy, nickel-copper alloy and stainless steel, inorganic short fibers such as asbestos, ceramic fiber, glass and carbon, and organic short fibers such as cotton, rayon, phenol, Aramid, PBI, PTFE, PEI, PPS and PEEK. As the rubber, nitrile rubber, chloroprene rubber, fluororubber and others may be properly used selectively, and examples of resin may include, in particular, phenol resin and epoxy resin. As the lubricant, aside from the aforesaid natural graphite, expanded graphite, mica, petroleum wax and others may be used depending on intended use.

In the illustrated example, the solid bar-like structure 8 is formed by extruding a mixed material mainly composed of flexible graphite particles, but the bar-like structure 8 may be formed in a circular solid section by rounding a flexible graphite sheet of less than 5 mm in width, or a flexible graphite sheet cut in a rectangular form with width of less than 5 mm may be mixed together with at least one of short fiber, rubber and resin, and formed in a circular solid section.

In the above embodiments, the knitting threads 4, 4', 4", 4''', are prepared by bundling a plurality of threads twisting or braiding them, but it is also possible to compose a gland packing by twisting a single knitting thread 4, 4', 4" or 4''' so as to be suited to the dimensions or composition of the shaft seal part.

Meanwhile, in the aforesaid embodiments, the knitting threads 4, 4', 4", 4''' are square braided, but, of course, braiding by tubular plain stitch or lattice braiding may be used.

As the covering fiber, aside from the knitting shown above, tubular plain stitch, conduit knitting or tubular weaving may be applied, too.

The measured data of knitting threads are shown in Table 1.

TABLE 1

| No. | Core Material | Core Process | Surface covering Material | Surface covering Process | Strength kg | Elongation % | Processability Twist | Processability Braid |
|---|---|---|---|---|---|---|---|---|
| 1 | Corresponding to FIG. 1 of this invention | Laminate | Aramid (spun yarn) count 20 | Knitting | 4.5 | 15.8 | Possible | Possible |
| 2 | Corresponding to FIG. 1 of this invention | " | nickel-chromium-iron alloy 0.1 mmφ | " | 5.7 | 10.0 | Possible | Possible |
| 3 | Corresponding to FIG. 7 of this invention | " | nickel-chromium-iron alloy 0.1 mmφ | " | 7.2 | 5.3 | Possible | Possible |
| 4 | Corresponding to FIG. 4 of this invention | " | nickel-chromium-iron alloy 0.1 mmφ | " | 5.0 | 9.2 | Possible | Possible |
| 5 | Extrusion forming of flexible graphite powder 3 mmφ | Extrusion | nickel-chromium-iron alloy 0.1 mmφ | " | 0.8 | 1.5 | Impossible | Impossible |
| 6 | Corresponding to FIG. 10 of this invention | Kneading, extrusion | nickel-chromium-iron alloy 0.1 mmφ | " | 3.8 | 4.1 | Possible | Possible |

As clear from Table 1, the packing materials No. 1, No. 2, No. 3, No. 4 and No. 6 of this invention, are higher in strength and smaller in elongation as compared with the packing material No. 5, and it is also known that twisting and braiding can be carried out satisfactorily.

In the above embodiments, it is explained that the knitting threads 4, 4', 4'', 4''' are braided to be used as gland packing, but not limited to such gland packing, by ribbon stitching or plain stitching of knitting threads 4, 4', 4'', 4''', it may be possibly applied as a sealing packing between static members, and in this case, too, the same action and effect as in fabrication of glad packing will be obtained.

Thus, in the packing material and packing according to this invention, being composed of flexible graphite, it is not necessary to make as many packings as the number of different dimensions of shaft seal members, and bending and toughness are improved, and it may be preferably used as the gland packing or sealing material of static members.

What is claimed is:

1. A packing material comprising a flexible graphite sheet formed as a laminate of two to ten sheets and covering fibers, and wherein the covering fibers comprise a material selected from asbestos, ceramic fiber, glass fiber, carbon fiber, cotton, rayon, phenol, Aramid, polybenzimidazole, polytetrafluoroethylene, polyetherimide, polyphenylene sulfite or polyether etherketone.

2. A packing material as set forth in claim 1, wherein the covering fibers are knitted, tubular plain stitched, or tubular woven.

3. A packing material as set forth in claim 2, wherein the surface of covering fibers is impregnated with surface treatment material which is selected from graphite powder, silicone oil, rubber-based adhesive or polytetrafluoroethylene.

4. A packing material comprising: at least one flexible graphite sheet covered by metal fibers selected from nickel-chromium-iron alloy, nickel-copper alloy or stainless steel wherein the covering fibers are knitted by any one of conduit knitting and tubular weaving.

5. A packing material as set forth in claim 4, wherein the thickness of the flexible graphite sheet is less than 1 mm.

6. A packing, fabricated by: cutting a flexible graphite sheet to a width of less than 5 mm; covering the surface of the flexible graphite sheet with fibers; impregnating the surface of the fibers with a surface treatment agent selected from graphite powder, silicone oil, rubber-based adhesive or polytetrafluoroethylene to form a knitting thread; and twisting or braiding the knitting thread.

7. A packing material as set forth in claim 6, wherein said flexible graphite sheet comprises a laminate of two to ten sheets, and wherein the covering fibers comprise a material selected from nickel-chromium-iron alloy, nickel-copper alloy, stainless steel, asbestos, ceramics fiber, glass fiber, carbon fiber, cotton, rayon, phenol, Aramid, polybenzimidazole, polytetrafluoroethylene, polyetherimide, polyphenylene sulfite or polyether etherketone.

8. A packing as set forth in claim 7, wherein the covering fibers are knitted by any one of, tubular plain stitched, conduit knitted and tubular woven.

9. A packing as set forth in claim 7, wherein said packing is formed in a cord by twisting at least one fiber covered flexible graphite sheet.

10. A packing as set forth in claim 7, wherein said packing is formed in a cord by any one of: twisting, square braiding; and lattice knitting.

11. A packing as set forth in claim 6, wherein the thickness of the flexible graphite sheet is less than 1 mm.

12. A packing material comprising: at least one flexible graphite sheet cut to a width of less than 5 mm; and fibers covering the flexible graphite sheet, wherein:
   the flexible graphite sheet comprises a laminate of two to ten sheets;
   the covering fibers comprises a material selected from nickel-chromium-iron alloy, nickel-copper alloy, stainless steel, asbestos, ceramics fiber, glass fiber, carbon fiber, cotton, rayon, phenol, Aramid, polybenzimidazole, polytetrafluoroethylene, polyetherimide, polyphenylene sulfite or polyether etherketone;
   the covering fibers are knitted by any one of: conduit knitting and tubular weaving;
   the surface of the covering fibers is impregnated with surface treatment material selected from graphite powder, silicone oil, rubber-based adhesive or polytetrafluoroethylene; and the surface of the covering fibers is impregnated with any one of zinc and sodium nitrate as a corrosion preventive.

13. A packing, fabricated by: cutting a flexible graphite sheet to a width of less than 5 mm; covering the surface of the flexible graphite sheet with fibers; impregnating the surface of the fibers with a surface treatment agent to form a knitting thread; and twisting or braiding the knitting thread, wherein:
  said flexible graphite sheet comprises a laminate of two to ten sheets; and
  the covering fibers comprise a material selected from nickel-chromium-iron alloy, nickel-copper alloy, stainless steel, asbestos, ceramics fiber, glass fiber, carbon fiber, cotton, rayon, phenol, Aramid, polybenzimidazole, polytetrafluoroethylene, polyetherimide, polyphenylene sulfite or polyether etherketone;
  the covering fibers are knitted by any one of: tubular plain stitching and tubular weaving; and
  any one of graphite powder, silicone oil, rubber-based adhesive or polytetrafluoroethylene is used as a surface treatment agent, and either zinc or sodium nitrate is used as a corrosion preventive.

14. A packing as set forth in claim 13, wherein said packing is formed by twisting at least one fiber covered flexible graphite sheet.

15. A packing as set forth in claim 13, wherein said packing is formed by any one of square braiding, tubular plain stitching, lattice knitting, ribbon weaving, and plain stitching and braiding.

* * * * *